United States Patent [19]
Walther et al.

[11] 3,843,200

[45] Oct. 22, 1974

[54] RIM MOUNTING

[75] Inventors: William D. Walther, Dayton; Robert A. DeRegnaucourt, Centerville, both of Ohio

[73] Assignee: Dayton-Walther Corporation, Dayton, Ohio

[22] Filed: Jan. 22, 1973

[21] Appl. No.: 325,654

[52] U.S. Cl. ............................ 301/12 R, 301/11 R
[51] Int. Cl. .......................................... B60b 23/00
[58] Field of Search .... 301/12 R, 10 R, 11 R, 13 R, 301/13 SM, 36 R, 19, 20; 85/1 R; 151/15, 70

[56] References Cited
UNITED STATES PATENTS

| | | | |
|---|---|---|---|
| 2,042,783 | 6/1936 | Hall | 85/1 R |
| 2,819,118 | 1/1958 | Fahlman | 301/13 SM |
| 2,911,256 | 11/1959 | Canady | 301/36 R |
| 3,259,437 | 7/1966 | Malthaner | 301/20 |

FOREIGN PATENTS OR APPLICATIONS 189,626   7/1922   Great Britain ..................... 85/1 R Primary Examiner—M. Henson Wood, Jr.
Assistant Examiner—Reinhard J. Eisenzopf
Attorney, Agent, or Firm—Mack D. Cook, II

[57] ABSTRACT

An assembly for mounting single or dual rims on a wheel with extreme accuracy. Sleeve elements on stud bolts and carrying fastening nuts moving clamp elements into engagement with a rim flange are moved to a predetermined "first stage" position to correctly align the rim on the wheel. Thereafter, the fastening nuts are moved relative to the sleeve elements to provide a "second stage" position so as to fully seat the rim on the wheel without distortion or misalignment.

8 Claims, 11 Drawing Figures

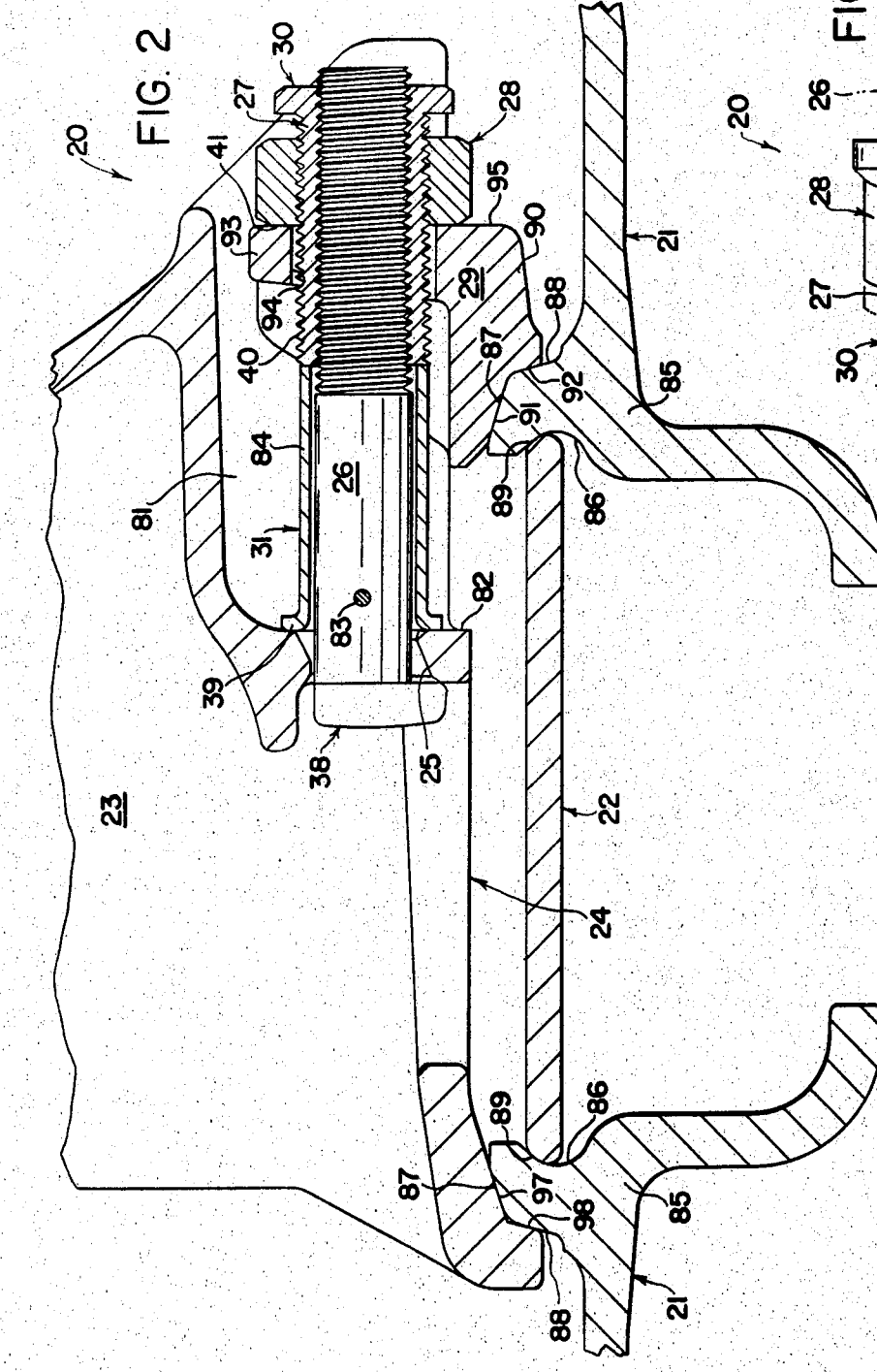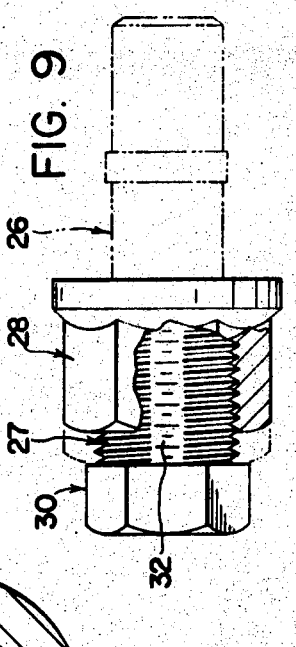

RIM MOUNTING

CROSS-REFERENCE TO RELATED APPLICATIONS

The subject matter of this invention is related to the subject matter of co-pending application Ser. No. 325,510, filed Jan. 22, 1973.

BACKGROUND OF THE INVENTION

The invention relates to the mounting of tire carrying rims, either single or dual, on a wheel, either front or rear, of a vehicle, such as a truck or trailer.

The prior art has many forms of assemblies for both single rim and dual rim mountings. U.S. Pat. No. 3,186,767, patented June/1965, U.S. Pat. Nos. 3,194,605 and No. 3,194,606, patented July/1965 and U.S. Pat. No. 3,382,007, patented May/1968, each to The Dayton Steel Foundry Company, contain disclosures of prior art assemblies of a support or stud bolt, fastening nuts, and clamp elements or lugs which have been used for rim mounting.

The accurate mounting of tire carrying rims on wheels has long been a problem in the art. Vehicle operators and industry regulations seek longer tire life and complete safety in operation, even under the most severe of vehicle operating conditions. The tire manufacture is endeavoring to provide tires which have optimum performance characteristics including balance. The wheel manufacturer has introduced quality control which provide wheels of uniform dimension and weight. However, the potential advantages provided by accuracy in tire and wheel manufacture have often been sacrificed or lost by improper rim mounting techniques.

The prior assemblies for rim mounting if properly used should assure lateral alignment and minimize radial runout of the rim when mounted. In the prior assemblies, the mechanic who mounts tire carrying rims on wheels has been provided with support bolts or studs carrying heavy nuts which are torqued down, preferably using pneumatically actuated or power assisted drivers or wrenches, to drive and force the clamp elements into high load engagement with the rim mounting flgnges. If the mechanis uses good judgment and procedure, as for example criss-cross tightening in steps of 30 foot pounds, then 100 foot pounds, then 225 foot pounds, he can achieve great accuracy in rim mounting. If the mechanic does not use good judgment and procedure, then the rim mounting will be incorrect and the technical requirements of correct lateral alignment and minimum radial runout will not be met when the vehicle is operated.

It has now been found that accuracy in the mounting of tire carrying rims on wheels may be achieved by the concepts of the present invention. More specifically, an assembly of elements has been provided so that rim mounting will have at least "first stage" and "second stage" positions. By providing for a "first stage" position, the rim is prevented from being drawn off side or out of alignment by the first clamping efforts. The "first stage" position approximates the final position insofar as the relation of the rim to the wheel is concerned, but does not achieve the "second state" or fully tightened position. The concepts of the present invention assure that the mechanic should tighten all fastening nuts in an equal or equivalent manner to establish a "first stage" for rim mounting. Thereafter, using a different size driver or wrench, the mechanic proceeds with a "second stage" for rim mounting. The present invention provides the mechanic with a means to fully seat tire carrying rims on wheels without distortion or misalignment.

SUMMARY OF THE INVENTION

The object of the invention is to provide an improved assembly for mounting single or dual rims on a wheel.

It is a further object of the invention to provide an assembly for at least "first stage" position and "second stage" position mounting of single or dual rims with accuracy so as to assure lateral alignment and minimize radial runout of the rims when mounted.

These and other objects of the invention, and the advantages thereof, will be apparent in view of the description of a Preferred Embodiment and alternative embodiments, as set forth below.

In general, an assembly for rim mounting according to the invention comprises a series or sets of support studs, sleeve elements, fastening nuts and clamp elements. The wheel has a series of axially directed bores adjacent the wheel felloe for securely mounting the axially inner portion of a support stud. Each support stud has an axially outer portion for mounting a sleeve element. Each sleeve element has external threads for rotatably mounting a fastening nut. Each fastening nut has a radially oriented flange surface for engaging a clamp element. Each clamp element has an axially directed bore for housing a support bolt and an axially directed portion for engaging the rim mounting flange.

A cap head engages the stud bolt threads and when rotated will move the sleeve element and cause a fastening nut on the sleeve threads to engage a clamp element and move the clamp element axially toward, and into engagement with, the rim mounting flange. There is a stop means engageable with either the stud bolt or the wheel to limit the extent of axially inward movement of the fastening nut and clamp element and thereby establish a "first stage" position for rim mounting. Subsequent rotation of a fastening nut away from the cap head will move the clamp element further axially inwardly and thereby provide a "second stage" position for rim mounting. During the "first stage" of rim mounting, the clamp elements will be positioned so as to correctly align the rim on the wheel felloe. During the "second stage" of rim mounting, the clamp elements will be positioned so as to fully seat the rim on the wheel felloe without distortion of misalignment.

DESCRIPTION OF THE DRAWINGS

FIG. 2 is a view, similar to FIG. 1, of another dual rim mounting according to the invention;

3

Figures 5, 6:
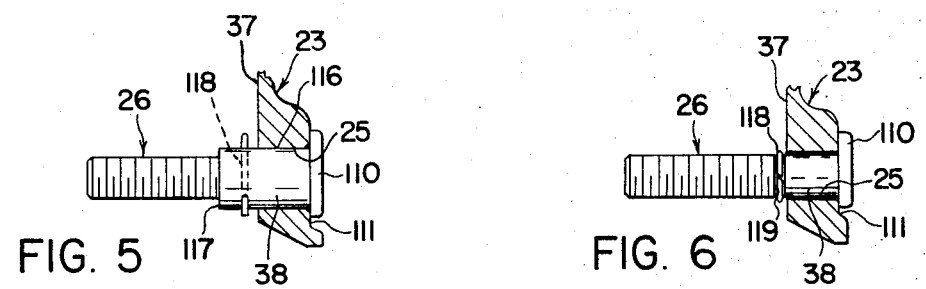
Figures 7, 8:
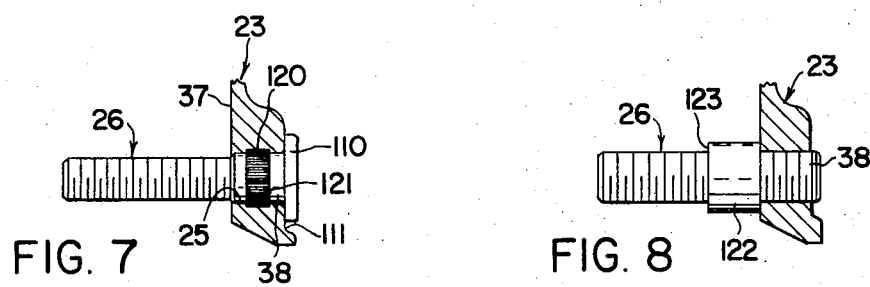
Figure 3:
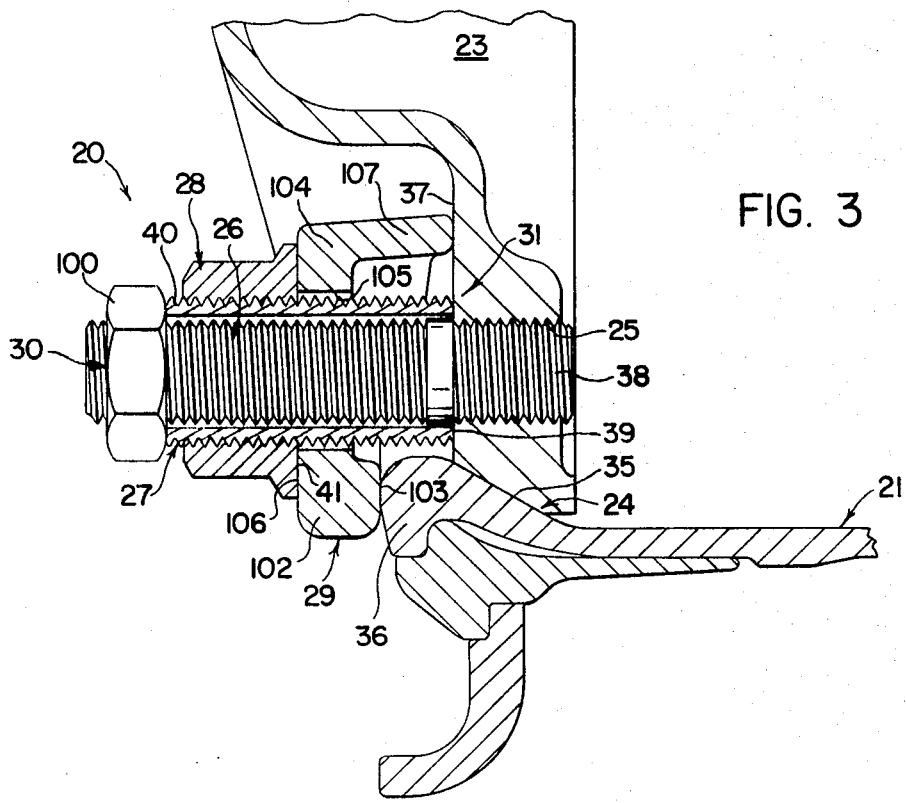
FIG. 3 is a fragmentary sectional view of a single rim mounting according to the invention.
Figure 4:
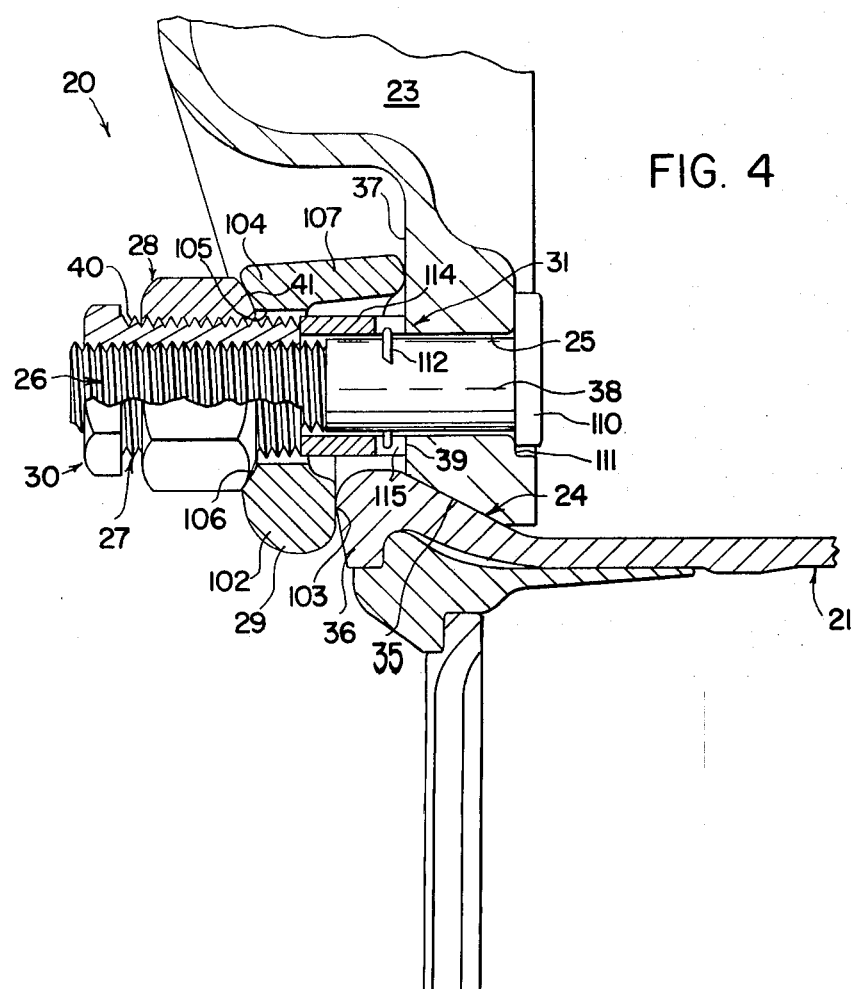
FIG. 4 is a view similar to FIG. 3 showing another form of support stud.

FIG. 5 is a partial detached view showing a modification to the support stud of FIG. 4;

FIG. 6 is another partial detached view showing a modification to the support stud of FIG. 4;

FIG. 7 is a partial detached view showing still another modification to the stud bolt of FIG. 4;

FIG. 8 is a detached view showing a modification to the support stud of FIG. 3; and FIG. 9 is a plan view of a support stud with indicia thereon to indicate relative position of a fastening nut during "second stage" mounting and also showing in chain lines the position of a fastening nut during "first stage" mounting.

DETAILED DESCRIPTION OF THE INVENTION

A rim mounting according to the invention is referred to generally by the numeral 20. The rims, whether single or dual inner and outer rims, are referred to generally by the numeral 21. The spacer for dual rim mounting is referred to generally by the numeral 22. The wheel is referred to generally by the numeral 23 with the wheel fellow, felly or load-bearing surface being referred to generally by the numeral 24 and with the axially directed bores adjacent the wheel felloe 24 being referred to generally by the numeral 25.

The support stud or bolt of each assembly 20 is referred to generally by the numeral 26. The sleeve element of an assembly 20 mounted on the stud bolt 26 is referred to generally by the numeral 27. The fastening nut of an assembly 20 rotatably mounted on the sleeve element 27 is referred to generally by the numeral 28. The axially directed portion of a clamp element of an assembly 20 for engaging a rim 21 is referred to generally by the numeral 29. The cap head for moving a sleeve element 27 is referred to generally by the numeral 30. The stop means for engagement with either a stud bolt 26 of the wheel 23 is referred to generally by the numeral 31. The linear indicia for showing if all fastening nuts 28 are moved axially inwardly an equal distance during the "second stage" for rim mounting is referred to generally by the numeral 32.

Figure 1:
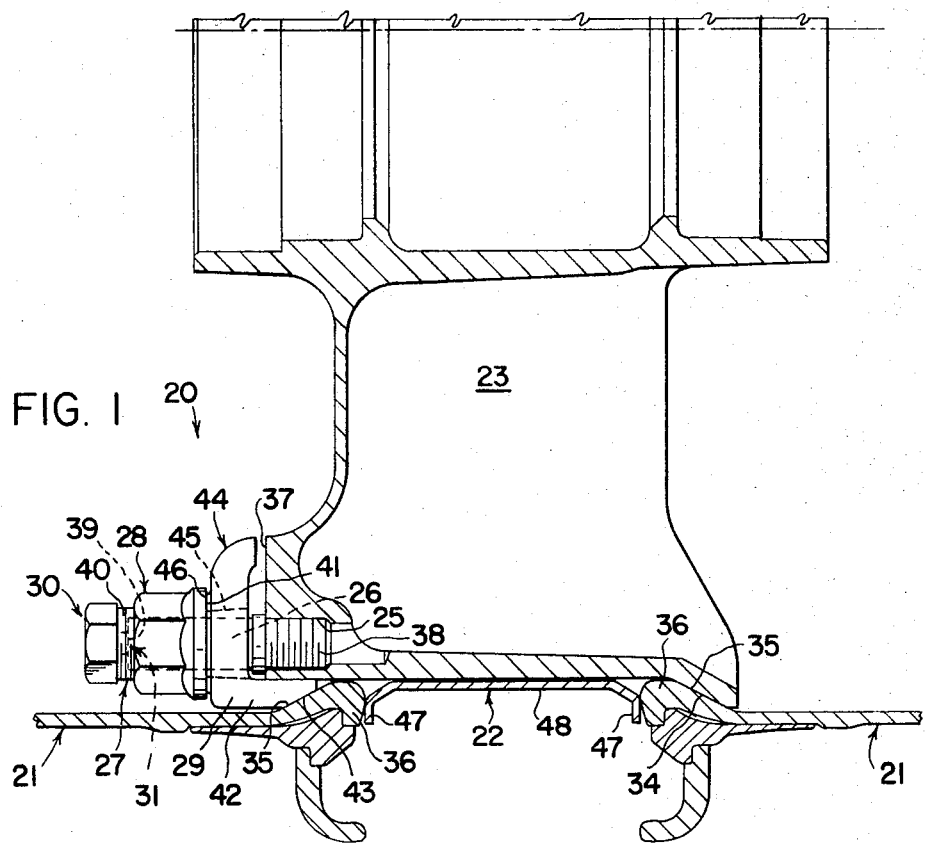
FIG. 1 is a fragmentary sectional view of a dual rim mounting according to the invention.

In FIG. 1, the assembly 20 is shown as used for the mounting of dual inner and outer rims 21 separated by a rigid spacer 22 on a wheel 23. The wheel 23 has a relatively wide felly surface 24 with an inclined surface 34 at the axially inner end for mating engagement with a radially inclined surface 35 on the mounting flange 36 of an inner rim 21. The axially outer end of the felly surface 24 terminates in radially oriented boss surfaces 37. The bores 25 extend axially inwardly from the boss surfaces 37.

In FIG. 1, and in the outer embodiments shown for use of an assembly 20, a stud bolt 26 has an axially inner portion 38 for secure mounting within an axial bore 25. The axially outer portion of a stud bolt 26 mounts a sleeve element 27. The sleeve element 27 has external threads for mating engagement with the threads of fastening nut 28. Associated with sleeve element 27 is a radially oriented surface 39 extending transverse the axis of a support stud 26 providing the stop means 31. The fastening nut 28 rotatably mounted on the threaded portion 40 of the sleeve element 27 has an axially inner or base portion providing a radially oriented flange surface 41 for engaging a clamp means including the clamp element 29.

4

In FIG. 1, the clamp element 29 is provided by the axially directed leg 42 of a conventional one-piece clamp lug having an inclined surface 43 for mating engagement with a radially inclined surface 35 on the mounting flange 36 of an outer rim 21. The axially directed leg 42 intersects a radially directed leg 44 with an axially directed bore 45 housing a stud bolt 26 and having an axially outer surface 46 for engagement with the fastening nut flange surface 41. The rigid spacer 22 is a conventional annular spacer or spacer ring carried on the felloe surface 24. The spacer has lateral flanges or marginal portions 47 carried by a non-compressible medial portion 48. The spacer edges 47 are preferably oriented substantially vertically or perpendicular to the rotational axis of the wheel 23.

Figure 1A:
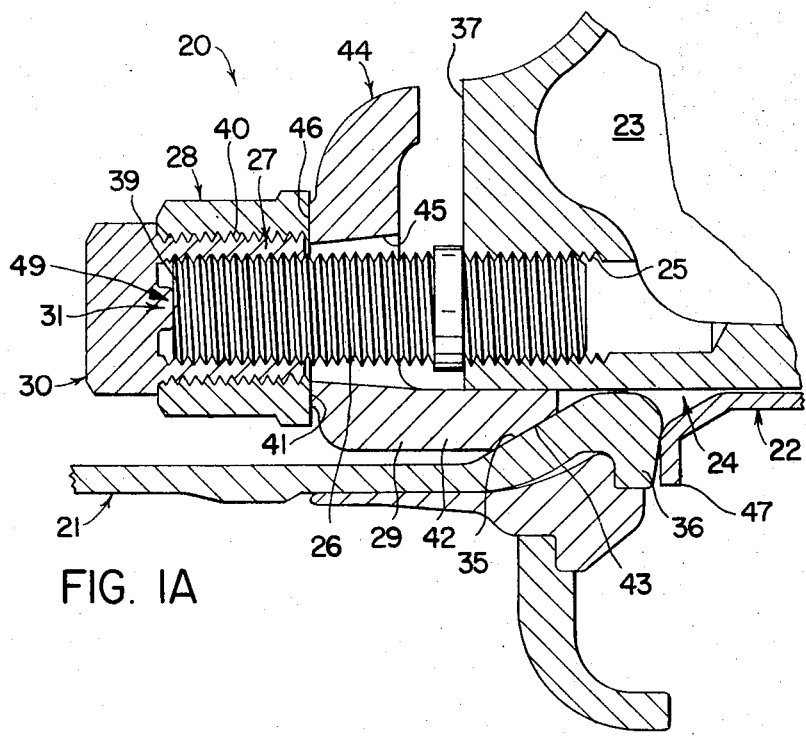
FIG. 1A is an enlarged fragmentary view showing the elements of FIG. 1 in "first stage" mounting position.
Figure 1B:
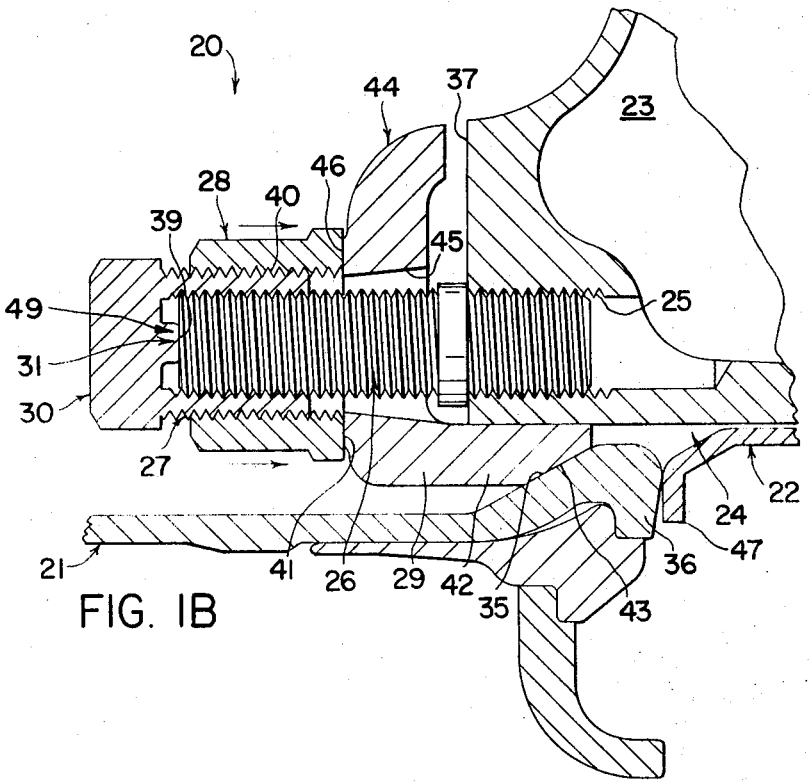
FIG. 1B is a similar view showing the elements of FIG. 1 in "second stage" mounting position.

In FIG. 1, the sleeve element 27 has internal threads for engagement with external threads on a stud bolt 26. The cap head 30 is formed integrally with the sleeve element 27. The radially oriented surface 39 providing the stop means 31 is on the axially inner end of a projection 49 (See FIGS. 1A and 1B) within the cap head 30 and engaging the end of a support stud 26.

[Numerals 50 through 80 are not used in this Specification.]

In FIG. 2, the assembly 20 is shown as used for the mounting of dual inner and outer rims 21 separated by a rigid spacer 22 on a wheel 23. The wheel 23 has a relatively wide felly surface 24 which is interrupted at the axially outer end by a series of axially directed recesses 81. Each recess 81 terminates at a radially directed boss surface 82 and houses a stud bolt 26. The bores 25 extend axially inwardly from the boss surfaces 82.

In FIG. 2, the stud bolt portion 38 has a shank head insertable into and through a bore 25 and securely fastened and aligned within the recess 81 in a conventional manner as by a cross-pin 83. The sleeve element 27 has internal threads for engagement with external threads on a stud bolt 26. The cap head 30 is formed integrally with the sleeve element 27. The sleeve element 27 is positioned by a spacer fitted coaxially of the stud bolt 26. The radially oriented surface 39 providing the stop means 31 is the axially inner end of a spacer 84 and engaging the boss surface 82 of a wheel 23.

In FIG. 2, each rim 21 has a radially inner flange 85. A rim mounting flange 85 has an axially outer concave surface 86 and an axially inclined surface 87 intersecting a radially directed surface 88. The spacer 22 is an annular spacer or spacer ring positioned around the wheel 23. The spacer has convex edges 89 for mating engagement with the surfaces 86 on the mounting flanges 85 of the dual rims 21.

In FIG. 2, the clamp element 29 is provided by the axially directed leg 90 of a one-piece clamp lug having intersecting surfaces 91 and 92 for mating engagement with the surfaces 87 and 88 on the mounting flange 85 of an outer rim 21. The axially directed leg 90 intersects a radially directed leg 93 with an axially directed bore 94 and having an axially outer surface 95 for engagement with a fastening nut flange surface 41.

In FIG. 2, the axially inner end of the wheel felloe 24 has intersecting surfaces 97 and 98 for mating engagement with the surfaces 87 and 88 on the mounting flange 85 of an inner rim 21.

In FIG. 3, the assembly 20 is shown as used for the mounting of a single rim 21 on the wheel 23. The felloe surface 24 is inclined for mating engagement with the radially inclined surface 35 on the mounting flange 36 of the rim 21.

In FIG. 3, the sleeve element 27 is slidably mounted coaxially of the stud bolt 26. The cap head 30 is a nut 100 rotatably mounted on the external threads of a stud bolt 26. The radially oriented surface 39 providing the stop means 31 is the axially inner end of the sleeve element 27 and engaging the boss surface 37 of a wheel 23.

In FIG. 3, the clamp element 29 is provided by the axially directed leg 102 of a one-piece clamp lug having a radially oriented surface 103 for mating engagement with the mounting flange 36 of the rim 21. The axially directed leg 102 intersects a radially directed leg 104 with an axially directed bore 105 housing a sleeve element 27 and having an axially outer surface 106 for engagement with the fastening nut flange surface 41. The radially inner end of a clamp leg 104 preferably has an axially inwardly directed portion 107 for engagement with the wheel boss surface 37 during "second stage" positioning by the assembly 20.

In FIG. 4, the assembly 20 is shown as used for the mounting of a single rim 21 on the wheel 23. The felloe surface 24 is inclined for mating engagement with the radially inclined surface 35 on the mounting flange 36 of the rim 21.

In FIG. 4, the clamp element is provided by the axially directed leg 102 of a one-piece clamp lug having a radially oriented surface 103 for mating engagement with the mounting flange 36 of the rim 21. The axially directed leg 102 intersects a radially directed leg 104 with an axially directed bore 105 housing a sleeve element 27 and having an axially outer surface 106 for engagement with the fastening nut conical or "ball face" flange surface 41. The radially inner end of a clamp leg 104 preferably has an axially inwardly directed portion 107 for engagement with the wheel boss surface 37 during "second stage" positioning by the assembly 20.

In FIG. 4, the stud bolt portion 38 has a shank head 110 and is inserted from the rear of the wheel 23 into and through a bore 25. The shank head 110 is received in a recess 111 so as to be non-rotatably during rim mounting by the assembly 20. A cotter pin 112 adjacent the wheel boss surface 37 prevents accidental axial movement of a stud bolt 26 out of a bore 25.

In FIG. 4, the sleeve element 27 has internal threads for engagement with the external threads on stud bolt 26. The cap head 30 is formed integrally with the sleeve element 27. The sleeve element 27 is positioned by a spacer 114 fitted coaxially of the stud bolt 26 and slotted as at 115 to receive the cotter pin 112. The radially oriented surface 39 providing the stop means 31 is the axially inner end of the spacer 114 and engaging the boss surface 37 of a wheel 23.

FIG. 5 shows a modification to the stud bolt 26 of FIG. 4. In FIG. 5, the stud bolt portion 38 has an enlarged diameter as at 116, between the shank head 110 and the threaded portion, to provide an annular stop surface 117 for engagement by the surface 39 of a stop means 31. A cross-pin inserted through a bore 118 prevent accidental axial movement of a stud bolt 26 out of a bore 25.

In FIG. 6, the stud bolt 26 of FIG. 4 is shown as modified for use of retaining ring or spring clip 118 received in an annular groove 119 to prevent accidental axial movement of the stud bolt out of a bore 25.

FIG. 7 shows another modification to the stud bolt 26 of FIG. 4. In FIG. 7, the stud bolt portion 38 has a serrated metal collar 120 formed integrally thereon. The circumference of the bore 25 has an annular groove 121 for receiving the collar 120 on a stud bolt 26 inserted therethrough. Thereafter, the collar 120 and groove 121 prevents movement of a stud bolt 26 out of a bore 25.

FIG. 8 shows a modification to the stud bolt of FIG. 3. In FIG. 8, the medial portion of the stud bolt 26 has an enlarged collar 122 providing an annular stop surface 123 for engagement by the surface 39 of a stop means 31.

FIG. 9 illustrates a support stud or bolt 26, sleeve element 27, fastening nut 28 and cap head 30 of an assembly 20 and further shows the linear indicia or scale 32 which has a suitable calibration thereon to indicate the extent of movement by a fastening nut 28 away from a cap head 30 during "second stage" for rim mounting.

OTHER EMBODIMENTS AND MODIFICATIONS

It should be apparent from the drawings and description that the provision for "first stage" and "second stage" positions for rim mounting represents an optimum producing of highly advantageous results. However, the concepts of the invention as disclosed herein could be carried to three or more stages providing repetitive techniques or an iteration process or concept for rim mounting.

Accordingly, the scope of the claims set forth below should be limited only by the concepts disclosed herein and not by specific details of the described embodiments.

FURTHER DESCRIPTION OF RIM MOUNTING

In FIG. 1 A, the assembly 20 of FIG. 1 is shown in "first stage" mounting position of an outer rim 21 on a wheel felloe surface 24. Prior to this, the fastening nut 28 has been threaded onto portion 40 of the sleeve element 27 and rotated outwardly into contact with the cap head 30. The stud bolt 26 has also been inserted through the bore 45 of the clamp lug which is located with the clamp element radially outwardly of the wheel felloe 24. Thereafter, the sleeve element 27 has been fitted on to stud bolt 26 and rotated until the stop means 31 has contacted the stud bolt end. In this position, the clamp element 29 will be in mating engagement with the inclined surface 35 on the rim mounting flange 36 and in piloted engagement with the wheel felloe 24, and, the outer rim will be in contact with the spacer edge 47, so as to correctly align the outer rim 21 on the wheel felloe 24.

FIG. 1 B, follows sequentially of FIG. 1 A and shows the assembly 20 in the "second stage" mounting position. Prior to this, the fastening nut 28 on the portion 40 of the sleeve element 27 has been rotated away from the cap head 30 causing the flange surface 41 to further move the clamp element 29 axially in relation to the rim flange 36. In this position, the clamp element will be in seating engagement with the rim surface 35 and the wheel felloe 24, and the outer rim will be in seating engagement with the spacer edge 47, so as to fully seat the outer rim on the wheel felloe without distortion or misalignment.

The mechanic is preferably instructed when using the assembly 20 for rim mounting to refer to the linear indicia 32 on the stud bolt 26 on the sleeve element 27 to assure that all fastening nuts 28 are moved an equal distance during the "second stage" for rim mounting.

What is claimed is:

1. An assembly for mounting of at least one rim having a mounting flange on the felloe of a wheel, said assembly comprising a series of support studs, rotatable sleeve elements, fastening nuts and clamp elements, said wheel having a series of axially directed bores adjacent said wheel felloe for securely mounting the axially inner portion of a support stud, each support stud having an axially outer portion with external threads and movably mounting a sleeve element, each sleeve element having external threads for rotatably mounting a fastening nut, each fastening nut having radially oriented flange surface of engaging a clamp element, each clamp element having an axially directed portion for engaging the rim mounting flange, there being a cap head mounted on each support stud which when rotated will move a sleeve element and cause a fastening nut on said sleeve threads to engage a clamp element and move said clamp element axially toward the mounting flange, said assembly including a radially oriented surface extending transverse the axis of each support stud, said surface providing a stop means to both limit the extent of axially inward movement of a sleeve element and to limit the extent of axially inward movement of a fastening nut and clamp element, whereby, subsequent rotation of a fastening nut away from said cap head will fully seat the rim on the wheel.

2. An assembly according to claim 1, wherein said sleeve element has internal threads mating with said support stud threads.

3. An assembly according to claim 1, wherein said sleeve element is fitted coaxially of said support stud and said cap head is a nut rotatably mounted on said support stud threads.

4. An assembly according to claim 1, wherein the axially directed portion of a clamp element is the axially directed leg of a one-piece clamp lug intersecting a radially directed leg having an axially outer surface for engagement with said fastening nut flange surface.

5. An assembly according to claim 1, wherein said cap head is formed integrally with said sleeve element.

6. An assembly for mounting of at least one rim having a mounting flange on the felloe of a wheel, said assembly comprising a series of support studs, rotatable sleeve elements, fastening nuts and clamp elements, said wheel having a series of axially directed bores adjacent said wheel felloe for securely mounting the axially inner portion of a support stud, each support stud having an axially outer portion with external threads and movably mounting a sleeve element, each sleeve element having external threads for rotatably mounting a fastening nut, each fastening nut having a radially oriented flange surface for engaging a clamp element, each clamp element having an axially directed portion for engaging said rim mounting flange, there being a cap head formed integrally with each sleeve element, which when rotated will move said sleeve element and cause a fastening nut on said sleeve threads to engage a clamp element and move said clamp element axially toward the mounting flange, there being a radially oriented surface extending transverse the axis of each support stud to limit the extent of axially inward movement of a fastening nut and clamp element, said surface being on the axially inner end of a projection within each cap head and engaging a support stud, whereby, subsequent rotation of a fastening nut away from a cap head will fully seat the rim on the wheel.

7. An assembly for mounting of at least one rim having a mounting flange on the felloe of a wheel, said assembly comprising a series of support studs, rotatable sleeve elements, spacers, fastening nuts and clamp elements, said wheel having a series of axially directed bores adjacent said wheel felloe for securely mounting the axially inner portion of a support stud, each support stud having an axially outer portion with external threads and movably mounting a sleeve element, each sleeve element having external threads for rotatably mounting a fastening nut and being positioned by a spacer fitted coaxially of a support stud, each fastening nut having a radially oriented flange surface of engaging a clamp element, each clamp element having an axially directed portion for engaging said rim mounting flange, there being a cap head mounted on each support stud which when rotated will move a sleeve element and cause a fastening nut on said sleeve threads to engage a clamp element and move said clamp element axially toward the mounting flange, there being a radially oriented surface extending transverse the axis of each support stud to limit the extent of axially inward movement of a fastening nut and and clamp element, said surface being on the axially inner end of each spacer, whereby, subsequent rotation of a fastening nut away from a cap head will fully seat the rim on the wheel.

8. An assembly for mounting of at least one rim having a mounting flange on the felloe of a wheel, said assembly comprising a series of support studs, rotatable sleeve elements, fastening nuts and clamp elements, said wheel having a series of axially directed bores adjacent said wheel felloe for securely mounting the axially inner portion of a support stud, each support stud having an axially outer portion with external threads and slidably mounting a sleeve element, each sleeve element having external threads for rotatably mounting a fastening nut, each fastening nut having a radially oriented flange surface for engaging a clamp element, each clamp element having an axially directed portion for engaging said rim mounting flange, there being a cap head mounted on the threads of each support stud which when rotated will slidably move a sleeve element and cause a fastening nut on said sleeve threads to engage a clamp element and move said clamp element axially toward the mounting flange,
there being a radially oriented surface extending transverse the axis of each support stud to limit the extent of axially inward movement of a fastening nut and clamp element, said surface being on the axially inner end of each sleeve element,
whereby, subsequent rotation of a fastening nut away from a cap head will fully seat the rim on the wheel.

* * * * *